US006850524B1

(12) United States Patent
Troxel et al.

(10) Patent No.: US 6,850,524 B1
(45) Date of Patent: Feb. 1, 2005

(54) SYSTEMS AND METHODS FOR PREDICTIVE ROUTING

(76) Inventors: Gregory Donald Troxel, P.O. Box 225, Stow, MA (US) 01775; David Paul Wiggins, 2 Sandy Brook Rd., Burlington, MA (US) 01803

( * ) Notice: Subject to any disclaimer, the term of this patent is extended or adjusted under 35 U.S.C. 154(b) by 878 days.

(21) Appl. No.: 09/630,304

(22) Filed: Jul. 31, 2000

(51) Int. Cl.[7] ............................................... H04L 12/56
(52) U.S. Cl. ................... 370/395.32; 370/351; 370/409
(58) Field of Search ................................ 370/230–231, 370/338, 351–355, 395.2–395.32, 400–402

(56) References Cited

U.S. PATENT DOCUMENTS

| | | | | |
|---|---|---|---|---|
| 5,995,503 | A | * 11/1999 | Crawley et al. | 370/351 |
| 6,049,524 | A | * 4/2000 | Fukushima et al. | 370/220 |
| 6,252,856 | B1 | * 6/2001 | Zhang | 370/254 |
| 6,363,319 | B1 | * 3/2002 | Hsu | 701/202 |
| 6,538,416 | B1 | * 3/2003 | Hahne et al. | 370/431 |
| 6,553,031 | B1 | * 4/2003 | Nakamura et al. | 370/395.31 |
| 6,577,634 | B1 | * 6/2003 | Tsukakoshi et al. | 370/395.31 |
| 6,597,663 | B1 | * 7/2003 | Rekhter | 370/252 |
| 6,606,325 | B1 | * 8/2003 | Cain | 370/410 |
| 6,621,798 | B1 | * 9/2003 | Krishnan et al. | 370/256 |
| 6,665,271 | B1 | * 12/2003 | Thomas et al. | 370/252 |

OTHER PUBLICATIONS

J. Moy, "OSPF Version 2," RFC2328, ftp://ftp.normos.org/ietf/rfc/rfc2323.txt, Apr. 1998, pp. 1–244.
R. Coltun, "The OSPF Opaque LSA Option," RFC2370, ftp://ftp.normos.org/ietf/rfc/rfc2370.txt, Jul. 1998, pp. 1–15.
D. Mills, "Network Time Protocol Version 3," RFC1305, ftp://ftp.normos.org/ietf/rfc/rfc1305.txt, Mar. 1992, pp. 1–55.
"Open Shortest Path First (OSPF)," Internetworking Technology Overview, Chapter42, Jun. 1999, pp. 42–1–42–6.
George Liu et al., A Class of Mobile Motion Prediction Algorithms for Wireless Mobile Computing and Communication, Mobile Networking Applications 1,2 (Oct. 1996), pp. 113–121.

* cited by examiner

*Primary Examiner*—Kenneth Vanderpuye
*Assistant Examiner*—Van Nguyen
(74) *Attorney, Agent, or Firm*—Ropes & Gray LLP

(57) ABSTRACT

A system provides predictive routing of packets in a network with multiple nodes. The system receives messages from the nodes (740). The messages contain predictions regarding future events that may happen to entities associated with the nodes. The system extracts the predictions from the received messages (750), determines active states of the entities based on the predictions (750), and generates a routing table using the active states of the entities (760). The system uses the routing table to route packets through the network.

44 Claims, 12 Drawing Sheets

300

```
 0                   1                   2                   3
 0 1 2 3 4 5 6 7 8 9 0 1 2 3 4 5 6 7 8 9 0 1 2 3 4 5 6 7 8 9 0 1
```

| EVENT TYPE | OSPF METRIC |
|---|---|
| EVENT TIME ||

| PEER IP ADDRESS |
|---|
| NUMBER OF EVENTS FOLLOWING |
| LIST OF EVENT PIECES<br>. . .<br>. . . |

| VERSION | RESERVED | NUMBER OF NODE EVENT PIECES |
|---|---|---|
| NUMBER OF INTERFACES FOLLOWING | | |
| LINK STATE EXAMINATION INTERVAL (LSEI) | | |
| LIST OF NODE EVENT PIECES ... ... | | |
| LIST OF INTERFACE PREDICTION PIECES ... ... | | |

| LS AGE | | OPTIONS | LS TYPE = 10 |
|---|---|---|---|
| LINK STATE ID = 235.0.0.0 ||||
| ADVERTISING NODE = 10.1.98.141 ||||
| LS SEQUENCE NUMBER ||||
| LS CHECKSUM || LENGTH = 96 ||
| VERSION = 1 | RESERVED = 0 | NUM NODE EVENT PIECES = 2 ||
| NUMBER OF INTERFACES FOLLOWING = 1 ||||
| LSEI INTEGER PART = 0 ||||
| LSEI FRACTION PART = 214748365 ||||
| EVENT = UP (1) | OSPF METRIC = IMP-DEP VALUE |||
| EVENT TIME INTEGER PART = t1i ||||
| EVENT TIME FRACTION PART = t1f ||||
| EVENT = DOWN (0) | OSPF METRIC = 0 |||
| EVENT TIME INTEGER PART = t2i ||||
| EVENT TIME FRACTION PART = t2f ||||
| INTERFACE IP ADDRESS = 10.1.100.231 ||||
| NUMBER OF EVENTS FOLLOWING = 2 ||||
| NUMBER OF PEERS FOLLOWING = 0 ||||
| EVENT = DOWN (0) | OSPF METRIC = 0 |||
| EVENT TIME INTEGER PART = t3i ||||
| EVENT TIME FRACTION PART = t3f ||||
| EVENT = UP (1) | OSPF METRIC = IMP-DEP VALUE |||
| EVENT TIME INTEGER PART = t4i ||||
| EVENT TIME FRACTION PART = t4f ||||

Sections: 1110, 1120, 1130, 1140, 1150

| LS AGE | OPTIONS | LS TYPE = 10 |
|---|---|---|
| LINK STATE ID = 235.0.0.0 | | |
| ADVERTISING NODE = 10.1.98.141 | | |
| LS SEQUENCE NUMBER | | |
| LS CHECKSUM | LENGTH = 124 | |
| VERSION = 1 | RESERVED = 0 | NUM NODE EVENT PIECES = 0 |
| NUMBER OF INTERFACES FOLLOWING = 1 | | |
| LSEI INTEGER PART = 0 | | |
| LSEI FRACTION PART = 214748365 | | |
| INTERFACE IP ADDRESS = 10.1.100.232 | | |
| NUMBER OF EVENTS FOLLOWING = 0 | | |
| NUMBER OF PEERS FOLLOWING = 2 | | |
| PEER IP ADDRESS = 10.1.98.142 | | |
| NUMBER OF EVENTS FOLLOWING = 3 | | |
| EVENT = UP (1) | OSPF METRIC = IMP-DEP VALUE | |
| EVENT TIME INTEGER PART = t1i | | |
| EVENT TIME FRACTION PART = t1f | | |
| EVENT = UP (1) | OSPF METRIC = IMP-DEP VALUE | |
| EVENT TIME INTEGER PART = t2i | | |
| EVENT TIME FRACTION PART = t2f | | |
| EVENT = DOWN (0) | OSPF METRIC = 0 | |
| EVENT TIME INTEGER PART = t3i | | |
| EVENT TIME FRACTION PART = t3f | | |
| PEER IP ADDRESS = 10.1.98.143 | | |
| NUMBER OF EVENTS FOLLOWING = 2 | | |
| EVENT = UP (1) | OSPF METRIC = IMP-DEP VALUE | |
| EVENT TIME INTEGER PART = t4i | | |
| EVENT TIME FRACTION PART = t4f | | |
| EVENT = UP (1) | OSPF METRIC = IMP-DEP VALUE | |
| EVENT TIME INTEGER PART = t5i | | |
| EVENT TIME FRACTION PART = t5f | | |

SYSTEMS AND METHODS FOR PREDICTIVE ROUTING

GOVERNMENT CONTRACT

The U.S. Government has a paid-up license in this invention and the right in limited circumstances to require the patent owner to license others on reasonable terms as provided for by the terms of Contract No. F30602-97-C-034 awarded by the U.S. Air Force.

BACKGROUND OF THE INVENTION

A. Field of the Invention

The present invention relates generally to routing systems and, more particularly, to systems and methods that select optimal routes in a network where some information about future states is available.

B. Description of Related Art

Conventional routing systems are reactive. When a failure occurs, protocol mechanisms eventually detect the failure and implement appropriate repair measures. While detection and repairs proceed, packets attempting to transit the point of failure may be lost.

A second problem is that repair measures (e.g., new routes) may be implemented at different times on different routers. The router that detects the network failure likely reacts first, with subsequent routers reacting when notified of the failure. Notification typically depends on how many hops the routers are from the router originally detecting the failure. Until this rolling reaction wave reaches all of the participating routers, temporary routing loops may exist that can cause additional packet loss.

These problems take on added significance in wireless networks, when mobile routers and wireless communication come into play. Wireless networks exhibit much more dynamic topologies. For example, a router may progress from having no connectivity with a group of other routers, to full connectivity, to no connectivity again in a very short time interval. This makes detecting and repairing network failures more complex.

As a result, a need exists for systems and methods that address the deficiencies in conventional routing systems by using predictive routing to optimally select routes in a network.

SUMMARY OF THE INVENTION

Systems and methods consistent with the present invention address this need by providing predictive routing that permits nodes to adjust their routing tables the instant a change in the network occurs, rather than at some later time.

In accordance with the purpose of the invention as embodied and broadly described herein, a system provides predictive routing of packets in a network with multiple nodes. The system receives messages from the nodes. The messages contain predictions regarding future events that may happen to entities associated with the nodes. The system extracts the predictions from the received messages, determines active states of the entities based on the predictions, and generates a routing table using the active states of the entities. The system uses the routing table to route packets through the network.

In another implementation consistent with the present invention, a method, performed by a node in a network with multiple nodes, generates prediction messages for predictive routing of packets in the network. The method includes generating predictions relating to at least one entity associated with the node; encoding the predictions into one or more prediction messages; and flooding the prediction messages on the network.

In yet another implementation consistent with the present invention, a memory device stores a prediction data structure. The prediction data structure includes a peer prediction piece, an interface prediction piece, and a node prediction piece. The peer prediction piece includes a peer event component that indicates a predicted event for a relationship between first and second nodes in a network and an event time component that indicates a time at which the predicted event may occur. The interface prediction piece includes an interface event component that indicates a predicted event for an interface associated with the first node and an event time component that indicates a time at which the predicted event may occur. The node prediction piece includes a node event component that indicates a predicted event for the first node and an event time component that indicates a time at which the predicted event may occur.

BRIEF DESCRIPTION OF THE DRAWINGS

The accompanying drawings, which are incorporated in and constitute a part of this specification, illustrate the invention and, together with the description, explain the invention. In the drawings.

FIG. 3 is an exemplary diagram of an Event piece in an implementation consistent with the present invention;

FIG. 4 is an exemplary diagram of a Peer Prediction piece in an implementation consistent with the present invention;

FIG. 6 is an exemplary diagram of a Node Prediction piece in an implementation consistent with the present invention;

FIG. 11 is a diagram of a PLSA in a third example consistent with the present invention; and FIG. 12 is a diagram of a PLSA in a fourth example consistent with the present invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide a predictive routing mechanism that permits nodes to adjust their packet forwarding tables the instant a change in the network, such as a link failure, occurs, rather than at some later time. Quicker response to changes results in fewer dropped packets and more packets being sent on optimal routes. The ability to make these just-in-time routing changes depends on the availability of information about the future state of links with other nodes.

EXEMPLARY NETWORK

Figure 1:
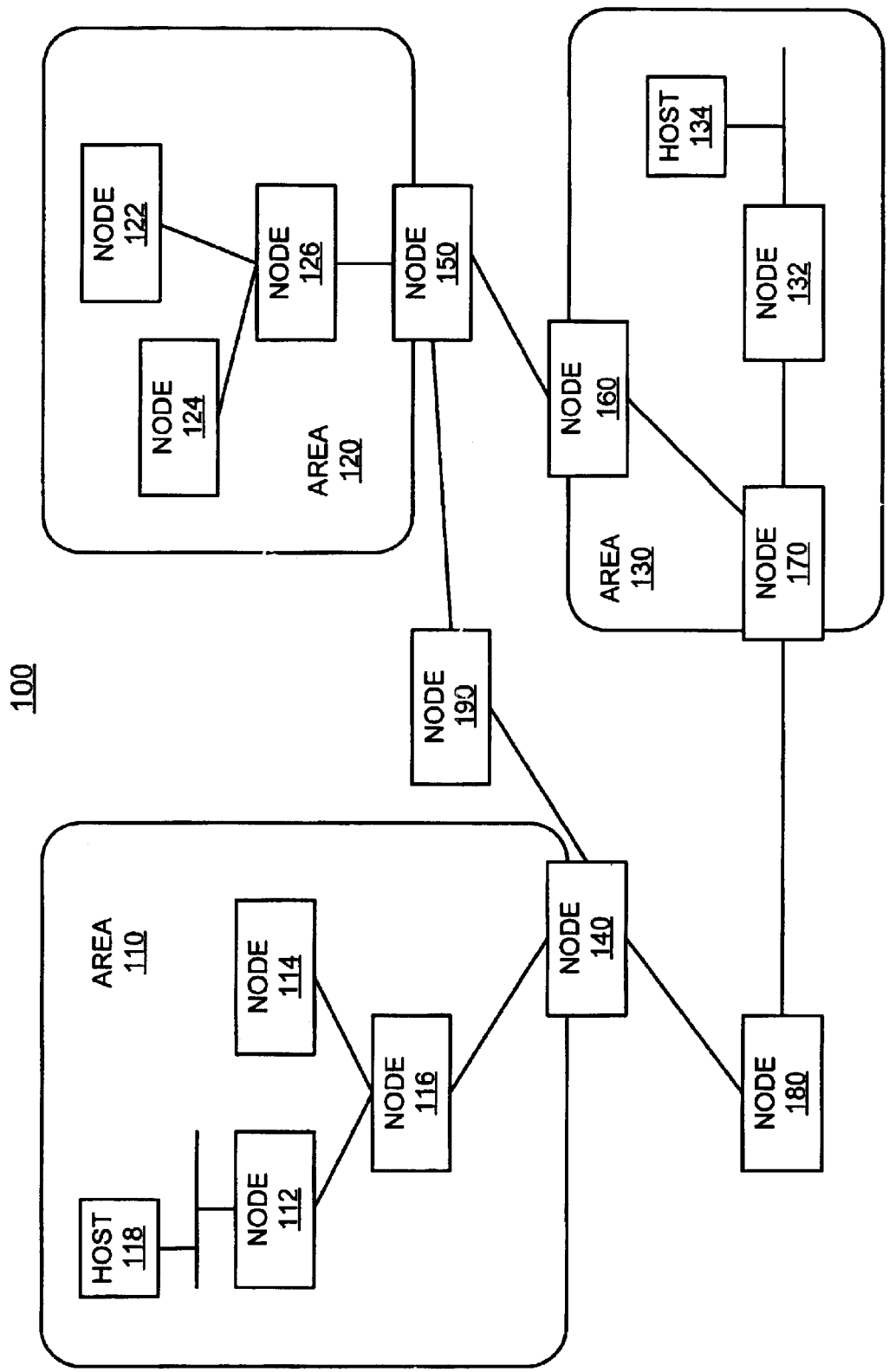
FIG. 1 is a diagram of an exemplary network in which systems and methods consistent with the present invention may be implemented.

FIG. 1 is an exemplary diagram of a network in which systems and methods consistent with the present invention may be implemented. The network may be an autonomous system 100 that implements a link-state protocol, such as the Open Shortest Path First (OSPF) routing protocol. OSPF is a link-state routing protocol that uses messages, such as link-state advertisements (LSAs), to provide information to all nodes in an area. The LSAs include current information, such as the state of interfaces, metrics used, and other variables. The nodes accumulate link-state information and may calculate the shortest path to each node using a shortest path first (SPF) algorithm. OSPF is described in more detail in J. Moy, "OSPF Version 2," RFC2328.txt, April 1998.

An autonomous system is a collection of networks that operate under a common administration and share a common routing strategy. OSPF operates within an autonomous system, though it may receive routes from and send routes to other autonomous systems. The autonomous system 100 includes multiple areas 110–130. Three areas have been shown for simplicity. All connections in the system 100 may be wired, wireless, or optical connections.

Each of the areas 110–130 includes one or more nodes connected to one or more hosts. The nodes may include any combination of routers, gateways, and bridges. Nodes with multiple interfaces may participate in more than one area. These nodes are called "area border" nodes. The system 100 may include area border nodes 140–170. Nodes that connect the areas 110–130 together are called "backbone" nodes. The system 100 may include backbone nodes 180 and 190.

Area 110, for example, may include nodes 112–116, host 118, and area border node 140. The node 112 connects to the host 118 via a network, such as a local area network (LAN). The host 118 may include a personal computer, a lap top, a wireless telephone, a personal digital assistant (PDA), or the like. The area border node 140 connects the area 110 to the backbone nodes 180 and 190.

Area 120 may include nodes 122–126 and area border node 150. The area border node 150 connects the area 120 to the backbone node 190 and the area border node 160 of area 130. Area 130 may include node 132, host 134, and area border nodes 160 and 170. The host 134 may include a personal computer, a lap top, a wireless telephone, a personal digital assistant (PDA), or the like. The area border node 160 connects to the area border node 170 and the area border node 150 of area 120. The area border node 170 connects to the area border node 160 and the backbone node 180.

Exemplary Node

Figure 2:
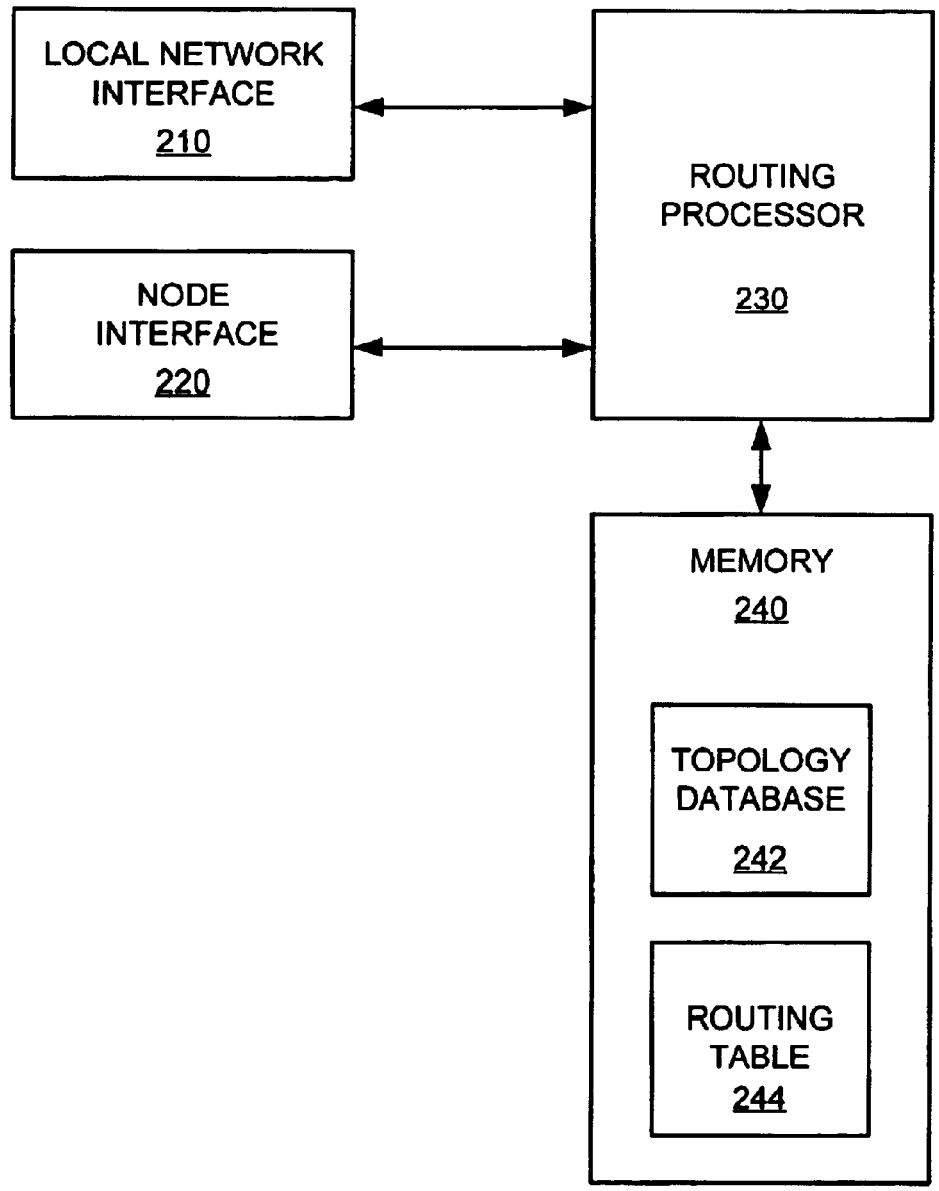
FIG. 2 is an exemplary diagram of a node in the network of FIG. 1.

FIG. 2 is an exemplary diagram of a node 200 consistent with the present invention. The node 200 may be any of the nodes shown in FIG. 1 and may include local network interface 210, node interface 220, routing processor 230, and memory 240. The local network interface 210 may include input and output buffers that temporarily buffer packets communicated with hosts and local networks within an area. The node interface 220 may include input and output buffers that temporarily buffer packets communicated with other nodes inside or outside an area. The routing processor 230 may include a processor, microprocessor, digital signal processor, etc. that analyzes incoming packets and determines appropriate interfaces (i.e., local network interface 210 or node interface 220), or appropriate output buffers within the interfaces, to which to send the packets.

The memory 240 may include a medium or large-capacity storage device, such as a random access memory (RAM) or an optical or magnetic recording medium and its corresponding drive. The memory 240 may store the routing protocol used by the processor 230. All of the nodes use the same routing protocol, such as the SPF routing algorithm. In addition to the routing protocol, the memory 240 provides the routing processor 230 with routing information to aid the routing processor 230 in the routing of packets.

The memory 240 may include a topology database 242 and a routing table 244. The topology database 242 may store information regarding the topology of the entire autonomous system 100, such as the state of a node's interfaces and the node's reachable neighbors. The topology database 242 obtains its information by collecting LSAs from all of the nodes in the same area (i.e., areas 110–130) or backbone. Each node generates LSAs and floods them so that all of the nodes within the same area contain identical topology databases 242. Area border nodes (e.g., nodes 140–170) contain information on the topology of all of the areas in which they participate. For example, the topology database 242 of the area border node 140 includes information on the topology of area 110 and the backbone of the autonomous system 100.

The routing processor 230 uses network state information to generate its routing table 244 by calculating a tree of shortest paths, in a conventional manner, with itself as the root of the tree. The tree gives the entire path to any destination network or host, but only the next hop to the destination is used in the forwarding process.

PREDICTIVE ROUTING

In a traditional link-state routing protocol, such as OSPF, link states are simple values or scalars. They can either be a cost, such as a number, or a special value indicating that the link does not exist. OSPF represents these values in terms of router LSAs; specifically, where the costs correspond to links that exist and links that do not exist are not included in the LSAs.

The central idea of predictive routing is that rather than distributing the current state, a mapping from times to states may be distributed. This may be referred to as distributing a function rather than a scalar. The domain of the function is time, and the range is the scalar used for link state in traditional OSPF. The function may be considered computationally as a procedure that takes one argument (i.e., a representation of an absolute time) and returns a value that is either an OSPF cost or a special value indicating "no link."

In traditional OSPF, each node generates LSAs that describe the current state of its links and floods them so that all of the nodes have a consistent topology database 242. With predictive OSPF, each node generates LSAs that instead contain a function (of time) for each link. In one implementation consistent with the present invention, the function is represented as a sequence of pairs of time and value, with the function's value at any point $t_i$ being the value associated with the latest time present in the sequence not greater than $t_1$.

To maintain some degree of interoperability with non-predictive-aware nodes (i.e., nodes that do not use predictive routing), the pairs of time and value may be encoded into opaque LSAs and called "Predictive LSAs" or PLSAs, leaving the original router LSAs unchanged. Opaque LSAs provide a generalized mechanism that permits future extensibility of the capabilities of OSPF LSAs. Opaque LSAs are described in more detail in R. Coltun, "The OSPF Opaque LSA Option," RFC2370, ftp://ftp.normos.org/ietf/rfc/rfc2370.txt, July 1998. The information contained in opaque LSAs may be used directly by the OSPF or indirectly by some application that wants to distribute information throughout the autonomous system 100.

PLSAs store predictions. A prediction specifies a future event that may happen to some entity. Entities may include entire nodes, their individual interfaces or links, or their relationships with other nodes. Events may include the entity going down, coming up, or changing its characteristics. Multiple predictions may be used at all levels (i.e., node, interface, peer). Predictions include the time at which the event may occur. The originating node chooses a function with some number of pairs of time and value (in much the same way as it chooses a cost value in traditional OSPF) for each entity and encodes the function into the PLSAs.

The nodes use the predictions in their routing table calculations to allow them to better respond to upcoming changes in the network. In some implementations consistent with the present invention, predictions are not tied to any specific routing protocol.

An exemplary abstract prediction may include:

```
(predictions
   (node address
      ; node-wide predictions (optional)
      (events
         (time state)
         . . .
         (time state)
      )
      (link address
         ; link-wide predictions (optional)
         (events
            (time state)
            . . .
            (time state)
         )
         (peer address
            ; peer-specific predictions (optional)
            (events
               (time state)
               . . .
               (time state)
            )
         )
         . . .
         (peer address
            (events
               (time state)
               . . .
               (time state)
            )
         )
      )
      . . .
      (link address
         ; predictions as for above link
      )
   )
)
```

An abstract prediction differs from the prediction encoded into a PLSA. The former predictions may include media access control (MAC) addresses and signal strength. The latter predictions may include router identifiers and OSPF metrics.

In the abstract prediction, subentities are indicated both by nesting of parentheses and by indentation. The notion of a peer being a sub-entity of a link means that the peer node is directly reachable via that link. The ellipsis (". . .") denotes a list of the type of element that appears above and below the ellipsis. The symbols predictions, node, link, peer, and events are literal (terminal) symbols. The symbol predictions introduces the entire expression. The symbols node, link, peer, and events introduce predictions for the entire node, a particular link of the node, a particular peer on a link, and a list of events, respectively.

The symbol time indicates the time at which the prediction takes effect. Time may take the form (ntpint ntpfrac), where ntpint is an integer holding the integer part of a network time protocol (NTP) timestamp and ntpfrac is an integer holding the fraction part of an NTP timestamp. The NTP timestamp is described in more detail in D. Mills, "Network Time Protocol (Version 3)," RFC1305, ftp://ftp.normos.org/ietf/rfc/rfc1305.txt, March 1992.

The symbol state indicates the state that the node, link, or peer may be in at the predicted time. The state may take several forms, such as "down" indicating that the node, link, or peer will be unusable; "up" indicating that the node, link, or peer will be usable; or "(up parameters)" which is the same as up, but also gives values for certain parameters about the node, link, or peer.

The parameters may include "(signal-strength float)" that provides a representation of the signal strength of a link or peer; "(loss-index float)" that provides a representation of the packet loss probability of a link or peer; and "(speed integer)" that provides the maximum transmission speed in bits/second, for example, of a link or peer.

The symbol address indicates a network address of a node, link, or peer. The address may include "(ip ip-address)" that provides, for example, an Internet Protocol version 4 (IPv4) address; or "(ethernet ethernet-address)" that provides, for example, an Ethernet address.

To distribute predictions, such as the above prediction, to all interested nodes, the routing processor 230 maps the predictions into a binary encoding and floods them in a PLSA, such as an opaque LSA with an LSA Type 10 flood to area and an Opaque Type of 235. LSA Type 11 denotes an opaque LSA that may be flooded to the entire autonomous system. Opaque Type 235 denotes a type of opaque LSA that is currently reserved for private and experimental use. Opaque Type 235 was chosen arbitrarily, other Opaque Types may alternatively be used.

A node floods one or more PLSAs containing predictions about its own future state. All prediction-capable nodes flood at least one PLSA, even if it contains no predictions, to notify the other nodes that it understands and will honor predictions. Multiple PLSAs from the same node may be distinguished by different Opaque IDs.

As with conventional OSPF LSAs, flooding a PLSA replaces any existing LSA having the same values in the Advertising Node, LSA Type, Opaque Type, and Opaque ID fields of the LSA header. This provides a convenient mechanism to retract or revise a prediction: simply remove or change the prediction in the PLSA and reflood it.

The routing processor 230 converts the top-level (node) expression to a Node Prediction piece, the (link) expression to an Interface Prediction piece, and the (peer) expression to a Peer Prediction piece in the PLSA.

The only part of the abstract prediction that undergoes a significant transformation is the state. The routing processor 230 maps the state into an Event piece. FIG. 3 is an exemplary diagram of an Event piece 300 in an implementation consistent with the present invention. The Event piece 300 includes an Event Type field, an OSPF metric field, and an Event Time field.

The Event Type field may include either a "down" value or an "up" value. The down value indicates that the entity will not be capable of forwarding packets. The up value indicates that the entity will be capable of forwarding packets.

The OSPF metric field may include a value that reflects various communication a parameters, such as signal strength, link quality, and speed, that may be in effect for the entity.

These parameters may be transformed into a metric in a number of different ways, any of which may be used here. If the Event Type field includes a down value, the OSPF metric field may contain an empty or null value. The Event Time field may include an NTP timestamp that specifies when this event may occur.

FIG. 4 is an exemplary diagram of a Peer Prediction piece 400 in an implementation consistent with the present invention. The Peer Prediction piece 400 includes a Peer IP Address field, a Number of Events Following field, and a List of Event Pieces field. The Peer IP address field may include the address of the peer to which the predictions that follow apply. The Number of Events Following field may store a value identifying the number of Event pieces provided in the List of Event Pieces field. The List of Event Pieces field may include predicted events for this peer. The events may be listed in increasing timestamp order, with no duplication of timestamp values.

Figure 5:
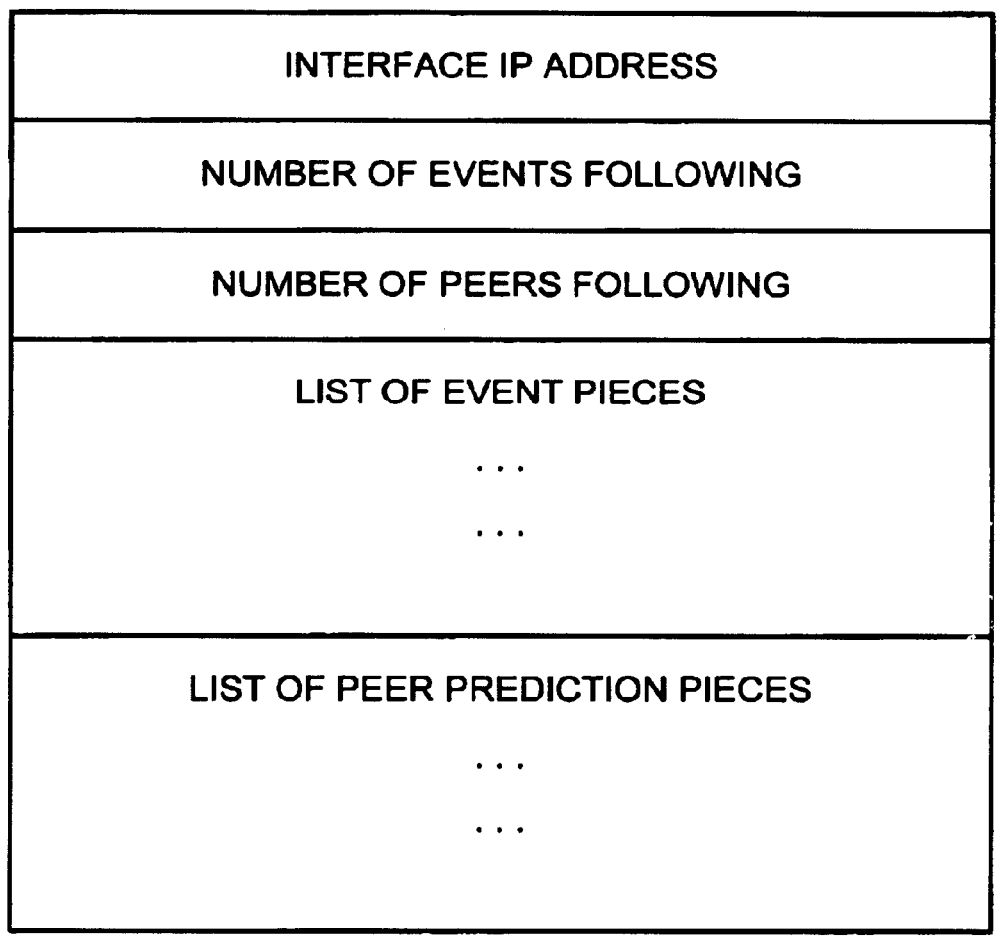
FIG. 5 is an exemplary diagram of an Interface Prediction piece in an implementation consistent with the present invention.

FIG. 5 is an exemplary diagram of an Interface Prediction piece 500 in an implementation consistent with the present invention. The Interface Prediction piece 500 includes an Interface IP Address field, a Number of Events Following field, a Number of Peers Following field, a List of Event Pieces field, and a List of Peer Prediction Pieces field. The Interface IP Address field may include the address of the interface to which the predictions that follow apply.

The Number of Events Following field may include a value indicating the number of Event pieces included in the List of Event Pieces field. The Number of Peers Following field may include a value indicating the number of Peer Prediction pieces included in the List of Peer Prediction Pieces field. The List of Event Pieces field may include predicted events for this interface. The events may be listed in increasing timestamp order, with no duplication of timestamp values. The List of Peer Prediction Pieces field may specify all of the peers on this interface and their associated predictions.

FIG. 6 is an exemplary diagram of a Node Prediction piece 600 in an implementation consistent with the present invention. The Node Prediction piece 600 includes a Version field, a Reserved field, a Number of Node Event Pieces field, a Number of Interfaces Following field, a Link State Examination Interval (LSEI) field, a List of Node Event Pieces field, and a List of Interface Prediction Pieces field. The Version field may indicate the version number of the prediction routing protocol. The Reserved field may be reserved for future use. The Number of Node Event Pieces field may include a value indicating the number of Event pieces included in the List of Node Event Pieces field. The Number of Interfaces Following field may include a value indicating the number of Interface Prediction pieces included in the List of Interface Prediction Pieces field.

The LSEI field may include an NTP timestamp used to divide time into intervals over which prediction functions are examined. For an LSEI=T, for example, the interval may be [kT, (k+1)T) for integer k. It may be beneficial for the LSEI value to remain constant. The List of Node Event Pieces field may include predictions that apply to the node as a whole. The events may be listed in increasing timestamp order, with no duplication of timestamp values. The List of Interface Prediction Pieces field may specify the interfaces for this node and their associated predictions.

If a node receives multiple PISAs from the same advertising node, the node merges them to form a single Prediction Set (PSet) for the advertising node. The node may perform the 1 merging by concatenating all of the Interface Prediction pieces together. The following conditions may produce errors: (1) more than one PLSA from the same node with the Number of Node Event Pieces field containing a value greater than zero; (2) more than one PLSA from the same node with an Interface Prediction Piece with the same Interface IP Address; or (3) different PLSAs from the same node with different values for the LSEI. If there is only one PLSA from a particular advertising node, the PLSA forms the complete PSet for that node.

Exemplary Predictive Routing Processing

Figure 7:
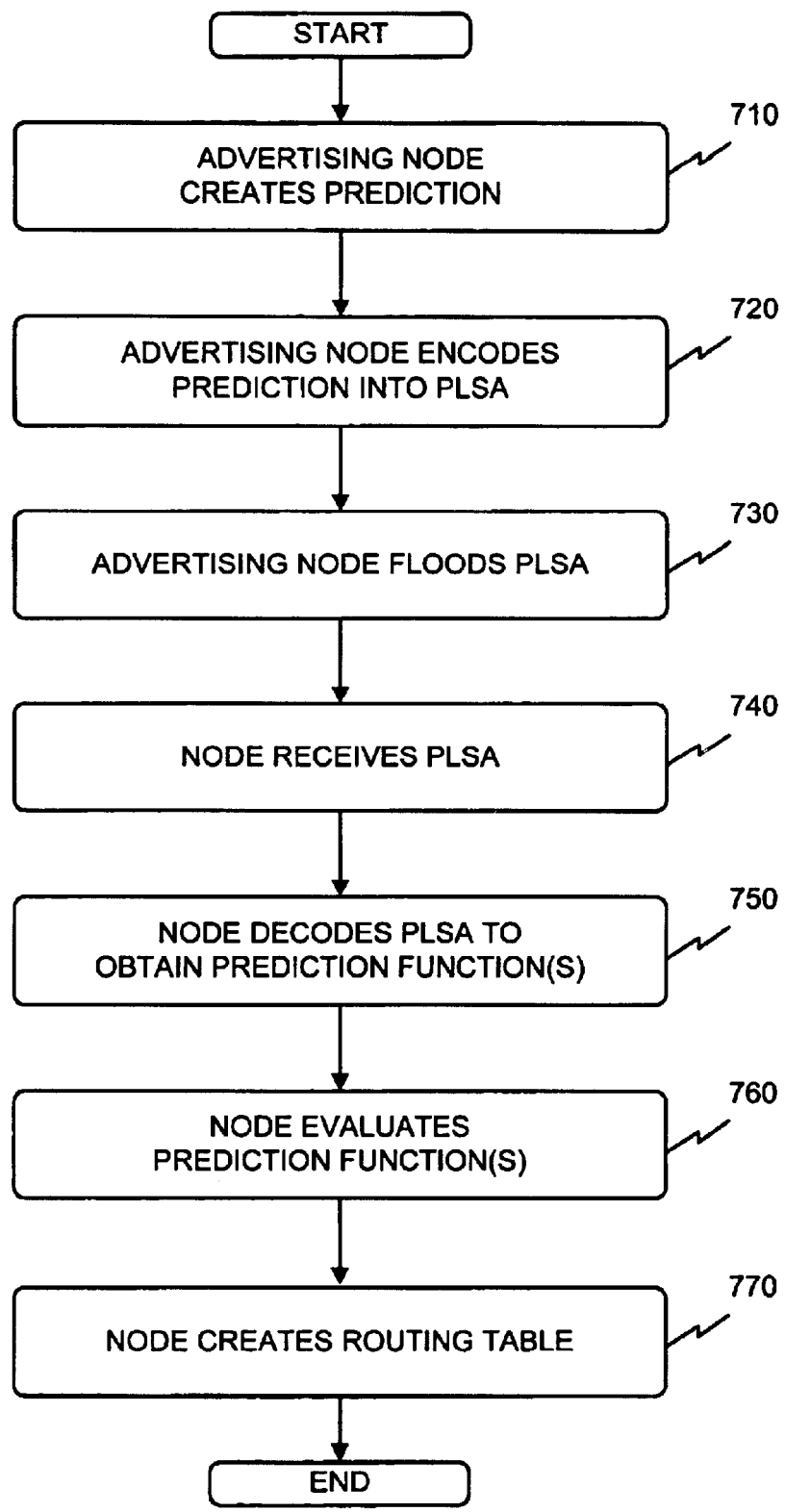
FIG. 7 is a flowchart of exemplary processing for predictive routing in a manner consistent with the present invention.

FIG. 7 is a flowchart of exemplary processing for predictive routing in a manner consistent with the present invention. Assume, for example, that the autonomous system 100 (FIG. 1) uses a link-state routing protocol, such as OSPF. When a node powers up, it initializes its routing protocol data structures and determines whether its interfaces are functional. The node then identifies its neighbors (i.e., nodes with interfaces to a common network) using, for example, the OSPF hello protocol. The node sends hello packets to its neighbors and receives their hello packets. Hello packets also act as keep-alive signals to let nodes know that other nodes are still functional. Based on the hello packets, the nodes create their topology databases 242 (FIG. 2).

Once the node creates its topology database 242, the node creates and floods LSAs that identify its status and the status of its interfaces or links. Each of the nodes uses the LSAs to create its routing table 244. The node also creates predictions that specify future events that may happen to the node, its interfaces, or its relationships with other nodes [step 710]. The node uses other techniques to predict events, such as an entity (i.e., node, interface, or peer) going down, coming up, or changing its characteristics, and the time that the predicted event may occur. For example, the node may use information regarding its operation, its environment, or changes in the signal strength on a link for predicting future events occurring to the node, an interface of the node, or a peer.

The node encodes the predictions into one or more PLSAs [step 720]. A1 The node may convert a node prediction to a Node Prediction piece, an interface or link prediction to an Interface Prediction piece, and a peer prediction to a Peer Prediction piece to form the PLSA. The node floods the PLSA in the same manner as it would an LSA [step 730]. The node uses the OSPF flooding protocol to transmit the PLSA to all of the nodes in its area.

Each node in the area receives all PLSAs from each other node [step 740]. If a node receives more than one PLSA from the same advertising node, the node may merge the PLSAs to form a single PSet for that node. The node decodes the PLSA to obtain a prediction function corresponding to each entity [step 750]. For any particular time, the node may apply each prediction function to that value of time and obtain a traditional cost or the special value that indicates that the entity does not exist [step 760].

The node may consider the existence and cost of a particular entity as a function of the current contents of the topology database 242 and the time for which the entity's state is requested. The result of this function may be referred to as the active state. If predictions from multiple levels (peer, link, or node) could apply to the entity at the given time, the node chooses the most specific prediction, such as choosing peer first, then link, then node predictions.

Figure 8A:
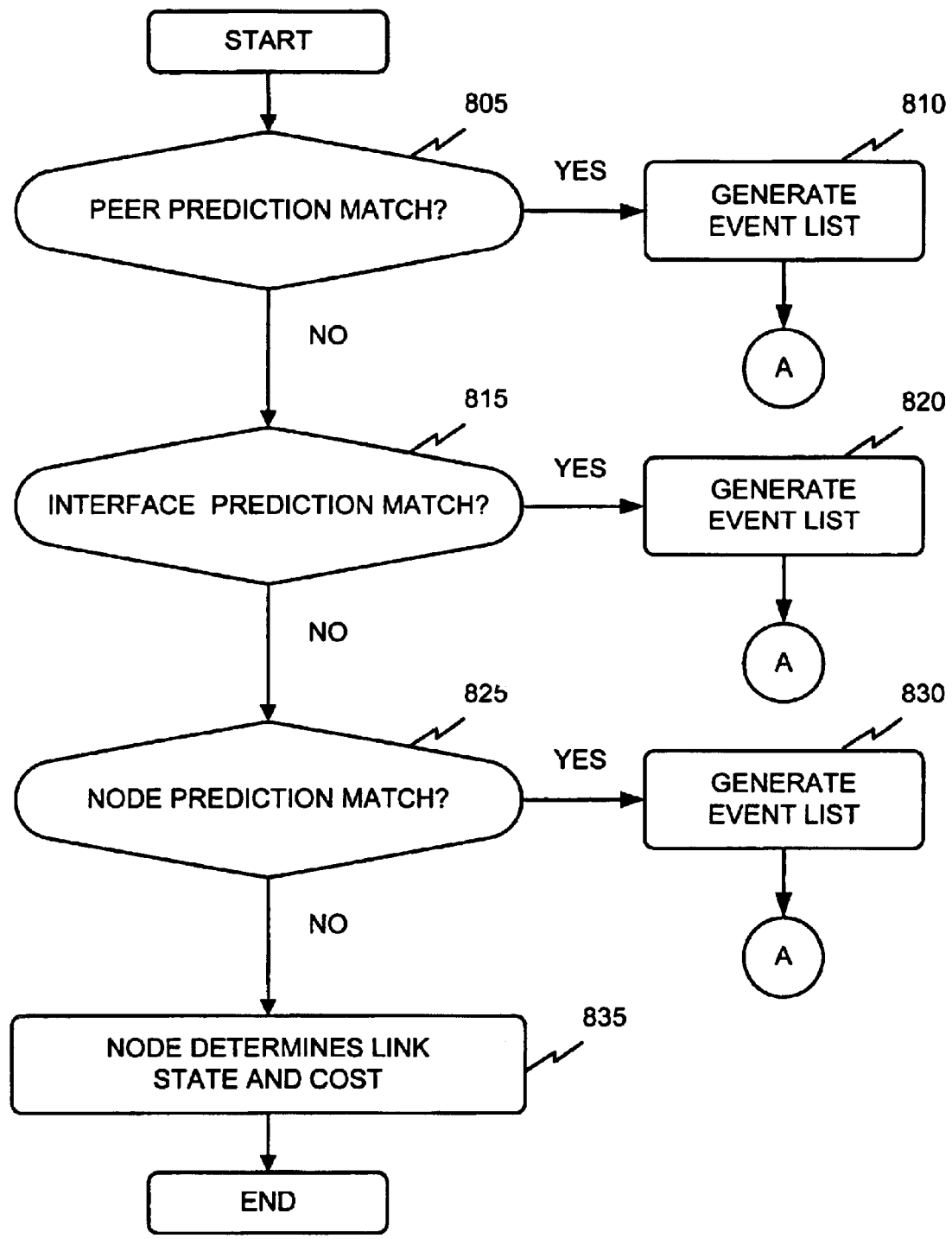
FIGS. 8A and 8B are flowcharts of exemplary processing for determining the state of a link in an implementation consistent with the present invention.
Figure 8B:
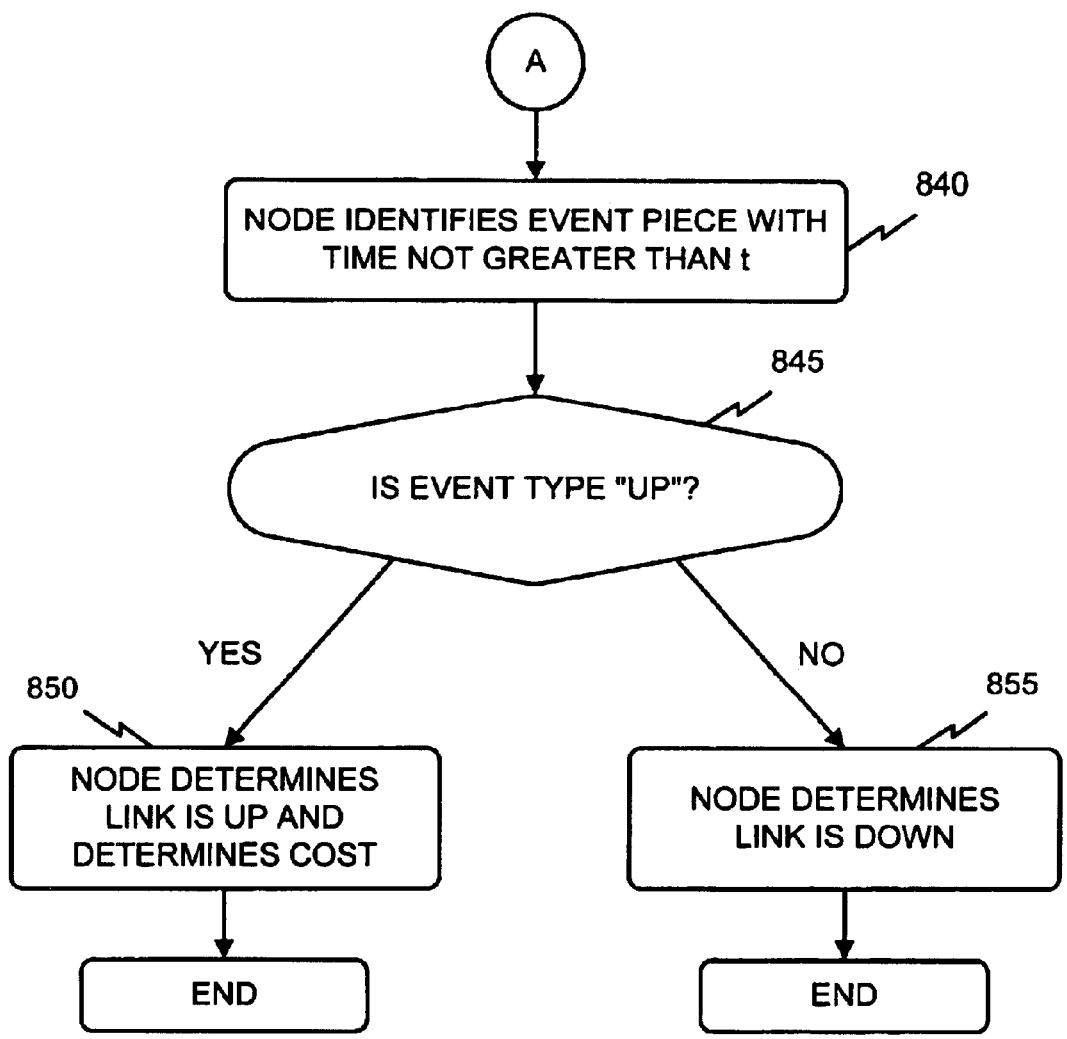

FIGS. 8A and 8B are flowcharts of processing for determining the state of a link in an implementation consistent with the present invention. Assume, for example, that a node wants to determine the active state of a point-to-point link with an advertising node at time t. Assume further that the topology database 242 contains all current LSAs.

If a PLSA exists from the advertising node, the node determines whether there is a matching peer prediction [step 805] (FIG. 8A). To make this determination, the node may determine whether the PSet contains a Peer Prediction piece that matches the link, the Peer Prediction piece includes at least one Event Piece, and the timestamp for the first Event Piece is less than or equal to t. If all of these are true, then the node sets the event list equal to the Event Pieces for this Peer Prediction piece [step 810].

If any of them are not true, then the node determines whether there is a matching interface prediction [step 815]. To make this determination, the node may determine whether the PSet contains an Interface Prediction piece that matches the link, the Interface Prediction piece includes at least one Event Piece, and the timestamp for the first Event Piece is less than or equal to t. If all of these are true, then the node sets the event list equal to the Event Pieces for this Interface Prediction piece [step 820].

If any of them are not true, then the node determines whether there is a matching node prediction [step 825]. To make this determination, the node may determine whether the PSet contains a Node Prediction piece, the Node Prediction piece includes at least one Event Piece, and the timestamp for the first Event Piece is less than or equal to t. If all of these are true, then the node sets the event list equal to the Event Pieces for this Node Prediction piece [step 830].

If no event list was generated from any of the above steps, then the node determines that the link is up and the link cost is equal to the link cost given in the LSA from the advertising node [step 835]. If an event list was generated in any of the steps 810, 820, and 830, the node identifies an Event Piece in the event list that has the largest Event Time not greater than t [step 840] (FIG. 8B). The node then determines whether the Event Type in that Event Piece is "up" [step 845]. If so, the node determines that the link is up and the link cost is equal to the minimum of the OSPF metric in that Event Piece and a predetermined constant [step 850]. The link cost may be determined in other ways. If the Event Type is not "up," the node determines that the link is down [step 855].

The result of the above processing is to determine the state of an entity, such as a link, at a specific time t. The node, however, is interested in the entity state for a time interval (i.e., the LSEI). The duration of the LSEI may be derived from the median of the LSEIs in the Node Prediction piece of all of the PLSAs. Other methods may be used to determine the LSEI. For example, the node may determine the duration of the LSEI from the maximum LSEI advertised by any node. A2 In some implementations consistent with the present invention, the LSEI is kept constant.

The node examines the entity state over the LSEI to find the worst value in terms of cost for any time in the interval, with a value indicating that the entity does not exist being worse than any cost value. Therefore, instead of using the actual function value at each point in time, the node uses this interval-worst value as the active state.

Returning to FIG. 7, the node generates its routing table 244 from the active states of the entities [step 770]. The node uses conventional techniques to generate the routing table 244, such as the technique described in J. Moy, "OSPF Version 2," RFC2328, ftp://ftp.normos.org/ietf/rfc/rfc2328.txt, April 1998. The routing table 244 is a function of the entity states and times and, therefore, may need to be computed, or recomputed, for all values of t. For optimization, however, the node may recompute its routing table 244 only at LSEI boundaries or upon changes to its topology database 242. In other words, the node may scan its PLSAs for edges and evaluate at each discrete value. It may be possible to trigger reevaluation during an interval if a changed LSA occurs or if a PLSA arrives with a different value during the interval, etc.

As a result of the above processing, the node can react quickly to changes in the network, thereby improving the node's ability to deliver packets optimally.

EXAMPLES OF PREDICTIONS AND CORRESPONDING PLSAs

Example 1

A first example includes an expression with no prediction.

```
(predictions
    (node (ip 10.1.98.141))
)
```

Figure 9:
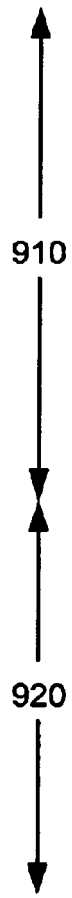
FIG. 9 is a diagram of a prediction link state advertisement (PLSA) in an example consistent with the present invention.

FIG. 9 is a diagram of an exemplary PLSA 900 containing the above expression. The PLSA 900 includes a conventional LSA header 910 and a Node Prediction piece 920. The LSA header 910 includes an LS age field, an Options field, an LS type field, a Link State ID field, an Advertising Node field, an LS Sequence Number field, an LS checksum field, and a Length field. These fields are described in more detail in J. Moy, "OSPF Version 2," RFC2328, ftp://ftp.normos.org/ietf/rfc/rfc2328.txt, April 1998. The Node Prediction piece 920 includes a Version field, a Reserved field, a Number of Node Event Pieces field, a Number of Interfaces Following field, and an LSEI field that assumes an LSEI of 50 milliseconds. These fields have been described above with regard to FIG. 6.

Example 2

A second example includes an expression indicating that the node comes up at time t1 and goes down at time t2. The integer part of the timestamp is represented by t1i and the fraction part by t1f.

```
(predictions
    (node (ip 10.1.98.141)
        (events
            ((t1i t1f) up)
            ((t2i t2f) down)
        )
    )
)
```

Figure 10:
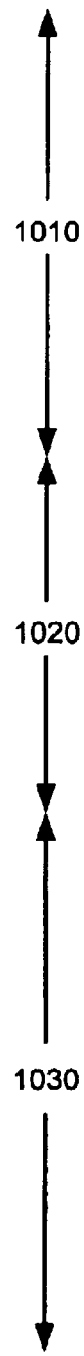
FIG. 10 is a diagram of a PLSA in a second example consistent with the present invention.

FIG. 10 is a diagram of an exemplary PLSA 1000 containing the above expression. The PLSA 1000 includes a conventional LSA header 1010, a Node Prediction piece 1020, and Node Event pieces 1030. The fields in the LSA header 1010 have been described above with regard to the first example. The fields of the Node Prediction piece 1020 and Node Event pieces 1030 have been described above with regard to FIG. 6. The node events shown in the expression above are encoded in the Node Event pieces 1030.

Example 3

A third example builds upon the second example by adding a couple of events for a particular link on the node.

```
(predictions
    (node (ip 10.1.98.141)
        (events
            ((t1i t1f) up)
            ((t2i 12f) down)
        )
        (link (ip 10.1.100.231)
            (events
                ((t3i t3f) down)
                ((t4i t4f) up)
            )
        )
    )
)
```

FIG. 11 is a diagram of an exemplary PLSA 1100 containing the above expression. The PLSA 1100 includes a conventional LSA header 1110, a Node Prediction piece 1120, Node Event pieces 1130, an Interface Prediction piece 1140, and Interface Event pieces 1150. The fields in the LSA header 1110 have been described above with regard to the first example. The fields of the Node Prediction piece 1120 and the Node Event pieces 1130 have been described above with regard to FIG. 6. The fields of the Interface Prediction piece 1140 and the Interface Event pieces 1150 have been described above with regard to FIG. 5. The node events and interface events shown in the expression above are encoded in the Node Event pieces 1130 and Interface Event pieces 1150, respectively.

Example 4

A fourth example demonstrates events for peers on a link, up events with parameters, and @ links identified by an Ethernet address instead of an IP address.

```
(predictions
    (node (ip 10.1.98.i41)
        (link (ethernet 8:0:8:9a:03:55)
            (peer (ip 10.1.98.142)
                (events
                    ((t1i t1f) (up (loss-index 1.4)))
                    ((t21 t2f) (up (signal-strength 12)))
                    ((t3i t3f) down)
                )
            )
            (peer (ip 10.1.98.143)
                (events
                    ((t4i t4f) (up (signal-strength 5) (loss-index 2.3)))
                    ((t5i t5f) (up (speed 185000)))
                )
            )
        )
    )
)
```

FIG. 12 is a diagram of an exemplary PLSA 1200 containing the above expression. The PLSA 1200 includes a conventional LSA header 1210, a Node Prediction piece 1220, an Interface Prediction piece 1230, a Peer Prediction piece 1240 with events for node 10.1.98.142, and a Peer Prediction piece 1250 with events for node 10.1.98.143. The fields in the LSA header 1210 have been described above with regard to the first example. The fields of the Node Prediction piece 1220 have been described above with regard to FIG. 6. The fields of the Interface Prediction piece 1230 have been described above with regard to FIG. 5. The fields of the Peer Prediction pieces 1240 and 1250 have been described above with regard to FIG. 4. The peer events shown in the expression above are encoded in the Peer Prediction pieces 1240 and 1250.

CONCLUSION

Systems and methods consistent with the present invention facilitate the selection of optimal routes in a network by predicting future changes in the network. The use of predictions allows nodes in the network to react quickly to network changes.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of steps have been provided with regard to the flowcharts of FIGS. 7, 8A, and 8B, the order of the steps may be altered in other implementations.

Further, while the preceding description described systems and methods using the OSPF routing protocol, other link-state routing protocols or distance-vector protocols may be used.

Also, in other implementations consistent with the present invention, the prediction encodings, PLSA formats, and methods for determining the active state of an entity vary from those described above.

The scope of the invention is defined by the claims and their equivalents.

What is claimed is:

1. A method for predictive routing of packets by a node in a network having a plurality of nodes, comprising:
   receiving messages from advertising nodes in the network, at least one of the messages containing a prediction regarding a future event that may happen to an entity associated with a corresponding advertising node;
   extracting the prediction from the received message;
   determining an active state of the entity based on the prediction;
   generating a routing table using the active state of the entity; and
   routing packets through the network using the routing table.

2. The method of claim 1, wherein the receiving includes:
   receiving at least two messages containing predictions from one of the advertising nodes, and
   merging the at least two messages.

3. The method of claim 1, wherein the entity includes one of the advertising node, an interface associated with the advertising node, or a relationship existing between the advertising node and another one of the nodes in the network; and
   wherein the receiving includes:
   receiving, from the advertising node, a message that includes predictions regarding a plurality of different entities.

4. The method of claim 1, wherein the receiving includes:
receiving at least one message that includes a plurality of predictions relating to a plurality of entities.

5. The method of claim 4, wherein the extracting includes:
decoding the at least one message to obtain a prediction corresponding to each of the entities.

6. The method of claim 1, wherein the extracting includes:
decoding the received message to obtain a prediction function corresponding to the entity.

7. The method of claim 6, wherein the determining includes:
applying a time value, corresponding to a future time, to the prediction function to determine the active state of the entity at the future time.

8. The method of claim 7, wherein the generating includes:
recomputing the routing table for each of a plurality of time values.

9. The method of claim 6, wherein the determining includes:
applying a plurality of time values, corresponding to a time interval, to the prediction function to determine cost values associated with the entity for the time interval, and
using the cost values to identify the active state of the entity for the time interval.

10. The method of claim 9, wherein the using includes:
identifying a worst cost value from the determined cost values, and using the worst cost value as the active state of the entity for the time interval.

11. The method of claim 9, wherein the generating includes:
recomputing the routing table, and
installing the recomputed routing table at the end of each of a plurality of time intervals.

12. The method of claim 1, wherein the generating includes:
recomputing the routing table upon changes to the active state of the entity.

13. A system for generating a routing table for predictive routing of packets in a network having a plurality of nodes, comprising:
means for obtaining messages from nodes in the network, the messages containing predictions regarding future events that may happen to entities associated with corresponding ones of the nodes;
means for extracting the predictions from the messages;
means for determining active states of the entities based on the predictions; and
means for generating a routing table, using the active states of the entities, for routing packets through the network.

14. A node in a network having a plurality of nodes, comprising:
a memory configured to store a routing table; and
a processor configured to receive messages from other nodes in the network, the messages containing predictions regarding future events that may happen to entities associated with corresponding ones of the other nodes, extract the predictions from the received messages, determine active states of the entities based on the predictions, recompute the routing table in the memory using the active states of the entities, and send packets through the network using the routing table.

15. The node of claim 14, wherein the processor is configured to obtain at least two messages containing predictions from a same one of the other nodes and merge the at least two messages.

16. The node of claim 14, wherein each of the entities includes one of the corresponding other node, an interface associated with the corresponding other node, and a relationship existing between the corresponding other node or one of the other nodes in the network.

17. The node of claim 16, wherein the processor is configured to obtain, from a same one of the other nodes, a message that includes predictions regarding a plurality of different entities.

18. The node of claim 14, wherein the processor is configured to receive at least one message that includes a plurality of predictions relating to a plurality of entities and decode the at least one message to obtain a prediction corresponding to each of the entities.

19. The node of claim 14, wherein the processor is configured to decode the received messages to obtain prediction functions corresponding to the entities.

20. The node of claim 19, wherein the processor is configured to apply a time value, corresponding to a future time, to each of the prediction functions to determine the active state of the corresponding entity at the future time.

21. The node of claim 20, wherein the processor is configured to recompute the routing table for each of a plurality of time values.

22. The node of claim 19, wherein the processor is configured to apply a plurality of time values, corresponding to a time interval, to each of the prediction functions to determine cost values associated with the corresponding entity for the time interval, and use the cost values to identify the active state of the corresponding entity for the time interval.

23. The node of claim 22, wherein the processor is configured to identify a worst cost value from the determined cost values and use the worst cost value as the active state of the corresponding entity for the time interval.

24. The node of claim 22, wherein the processor is configured to recompute the routing table and install the recomputed routing table at the end of each of a plurality of time intervals.

25. The node of claim 14, wherein the processor is configured to recompute the routing table upon changes to the active states of the entities.

26. The node of claim 14, wherein the processor is further configured to generate messages that include predictions regarding at least one entity.

27. The node of claim 26, wherein at least one of the generated messages includes at least one of an event piece, a peer prediction piece, an interface prediction piece, or a node prediction piece.

28. The node of claim 27, wherein the event piece includes:
an event type that indicates a predicted event for the entity, and
an event time that indicates a time at which the predicted event may occur.

29. The node of claim 27, wherein the peer prediction piece includes:
a peer address that indicates an address of one of the other nodes, and
at least one event piece that indicates predicted events for the other node.

30. The node of claim 27, wherein the interface prediction piece includes:
an interface address that indicates an address of an interface associated with the node, and
at least one event piece that indicates predicted events for the interface.

31. The node of claim 27, wherein the node prediction piece includes:
at least one node event piece that indicates predicted events for the node.

32. The node of claim 26, wherein the processor is further configured to transmit the generated messages on the network.

33. A computer-readable medium storing instructions for causing at least one processor to perform a method for generating a routing table for predictive routing of packets in a network having a plurality of routers, the method comprising:
- extracting predictions from messages received from routers in the network, the predictions identifying future events that may happen to entities associated with corresponding ones of the routers;
- determining active states of the entities based on the predictions; and
- generating a routing table, using the active states of the entities, for routing packets in the network.

34. A method for generating prediction messages for predictive routing of packets in a network having a plurality of nodes, the method, performed by at least one of the nodes, comprising:
- generating predictions relating to at least one entity associated with the node, wherein the generating predictions includes:
  - creating a prediction that specifies a future event that may occur to at least one of the node, an interface associated with the node, or a relationship between the node and at least one other node;
- encoding the predictions into one or more prediction messages; and
- flooding the prediction messages on the network.

35. The method of claim 34, wherein the generating includes:
- identifying an the future event that may occur to the at least one of the node, an interface associated with the node, or a relationship between the node and at least one other node,
- identifying a time at which the future event may occur, and
- creating a prediction iron the identified future event and time.

36. The method of claim 34, wherein the encoding includes:
- converting each of the predictions into at least one of a node prediction piece, an interface prediction piece, or a peer prediction piece, the node prediction piece specifying one or more future events that may occur to the node, the interface prediction piece specifying one or more future events that may occur to an interface associated with the node, and the peer prediction piece specifying one or more future events that may occur to a relationship between the node and at least one other node, and creating each of the prediction messages from one or more of the node prediction piece, the interface prediction piece, or and the peer prediction piece.

37. The method of claim 34, wherein the flooding includes:
- transmitting the prediction messages to all of the nodes in the network.

38. A computer-readable medium containing instructions for causing at least one processor to perform a method for generating prediction messages for predictive routing of packets in a network having a plurality of nodes, the method comprising:
- creating predictions relating to at least one entity associated with the processor, wherein the creating predictions includes:
  - creating a prediction that specifies a future event that may occur to at least one of the entity, an interface associated with the entity, or a relationship between the entity and at least one other entity;
- encoding the predictions into one or more prediction messages; and
- transmitting the prediction messages on the network.

39. A router in a network having a plurality of routers, comprising:
- a memory configured to store instructions; and
- a processor configured to execute the instructions in the memory to generate predictions relating to at least one entity associated with the router, encode the predictions into one or more prediction messages, and flood the prediction messages on the network, wherein the processor is configured to create a prediction that specifies a future event that may occur to at least one of the router, an interface associated with the router, or a relationship between the router and at least one other router.

40. The router of claim 39, wherein the processor is configured to identify the future event that may occur to the at least one of the router, an interface associated with the router, or a relationship between the router or at least one other router, identify a time at which the future event may occur, and create a prediction from the identified future event and time.

41. The router of claim 39, wherein the processor is configured to convert each of the predictions into at least one of a router prediction piece, an interface prediction piece, or a peer prediction piece, the router prediction piece specifying one or more future events that may occur to the router, the interface prediction piece specifying one or more future events that may occur to an interface associated with the router, and the peer prediction piece specifying one or more future events that may occur to a relationship between the router and at least one other router, and create each of the prediction messages from one or more of the router prediction piece, the interface prediction piece, or and the peer prediction piece.

42. The router of claim 39, wherein the processor is configured to transmit the prediction messages to all of the routers in the network.

43. The router of claim 39, wherein the processor is further configured to receive messages from other ones of the routers in the network, the messages containing predictions regarding future events that may happen to one or more entities associated with corresponding ones of the routers, extract the predictions from the received messages, and generate a routing table from the extracted predictions.

44. A memory device that stores a prediction data structure, comprising:
- a peer prediction piece including a peer event component that indicates a predicted event for a relationship between first and second nodes in a network and an event time component that indicates a time at which the predicted event may occur;
- an interface prediction piece including an interface event component that indicates a predicted event for an interface associated with the first node and an event time component that indicates a time at which the predicted event may occur; and
- a node prediction piece including a node event component that indicates a predicted event for the first node and an event time component that indicates a time at which the predicted event may occur.

* * * * *

UNITED STATES PATENT AND TRADEMARK OFFICE
CERTIFICATE OF CORRECTION

PATENT NO. : 6,850,524 B1
DATED : February 1, 2005
INVENTOR(S) : Troxel et al.

It is certified that error appears in the above-identified patent and that said Letters Patent is hereby corrected as shown below:

Column 15,
Line 39, please replace "iron" with -- from. --

Column 16,
Line 38, please delete the word "and."

Signed and Sealed this

Twenty-fourth Day of May, 2005

JON W. DUDAS
*Director of the United States Patent and Trademark Office*